United States Patent
Berger et al.

(10) Patent No.: US 11,781,058 B1
(45) Date of Patent: Oct. 10, 2023

(54) PROCESS FOR SAND AND PROPPANT CONSOLIDATION

(71) Applicant: OIL CHEM TECHNOLOGIES, INC., Sugar Land, TX (US)

(72) Inventors: Paul Daniel Berger, Sugar Land, TX (US); Christie Huimin Berger, Sugar Land, TX (US)

(73) Assignee: OIL CHEM TECHNOLOGIES, Sugar, Land, TX (US)

(*) Notice: Subject to any disclaimer, the term of this patent is extended or adjusted under 35 U.S.C. 154(b) by 0 days.

(21) Appl. No.: 17/803,592

(22) Filed: Sep. 1, 2022

(51) Int. Cl.
  *C09K 8/57* (2006.01)
  *E21B 43/25* (2006.01)
  *C09K 8/575* (2006.01)

(52) U.S. Cl.
  CPC .................. *C09K 8/5756* (2013.01)

(58) Field of Classification Search
  None
  See application file for complete search history.

(56) References Cited

U.S. PATENT DOCUMENTS

| | | | |
|---|---|---|---|
| 3,525,397 A * | 8/1970 | Darley | C09K 8/60 166/308.1 |
| 3,976,140 A | 8/1976 | Shaughnessy et al. | |
| 4,000,781 A | 1/1977 | Knapp | |
| 4,074,760 A * | 2/1978 | Copeland | C09K 8/5086 523/447 |
| 5,522,460 A | 6/1996 | Shu | |
| 6,311,773 B1 | 11/2001 | Todd et al. | |
| 7,975,764 B2 | 7/2011 | Sullivan et al. | |
| 9,494,026 B2 | 11/2016 | Vo et al. | |
| 9,567,511 B2 | 2/2017 | Wadekar et al. | |
| 10,604,694 B1 | 3/2020 | Berger et al. | |
| 2003/0230431 A1 | 12/2003 | Reddy et al. | |

* cited by examiner

*Primary Examiner* — Charles R Nold

(57) ABSTRACT

A process for consolidating sand, proppant and other suspended particles present in a subterranean reservoir using an aqueous emulsion particle consolidation system is described. Surfactants with cloud points at or below the reservoir temperature are used to make a low viscosity aqueous external emulsion system with resin and curing agent as the internal phase. As the surfactant reaches its cloud point, it loses its emulsification ability and releases the resin and curing agent to consolidate the sand. The aqueous phase of the system then functions as a spacer to maintain the permeability needed for oil and gas production without additional post flush required.

6 Claims, No Drawings

PROCESS FOR SAND AND PROPPANT CONSOLIDATION

The present application claims benefit of priority from Provisional Patent Application 63/360,141, filed on Sep. 7, 2021 and incorporated herein by reference in its entirety.

FIELD OF THE INVENTION

This present invention relates to the field of petroleum production. More specifically it relates to compositions and a process for consolidating sand, proppant and other particles present in subterranean formations that may interfere with the production of oil, gas, and/or water.

BRIEF DESCRIPTION OF THE DRAWINGS

No drawings are included.

BACKGROUND OF THE INVENTION

During the production of oil and gas, undesirable production of sand, proppants, formation fines and other contaminates may be produced with the oil and gas from the reservoir or from the proppant beds placed during the fracturing applications. The sand, proppants and formation fines may cause problems such as reduced production, plugged pathways, abrasion of production equipment, additional handling cost and refinery problems.

Several methods have been proposed and described in the prior art to help overcome this problem. These include, but are not limited to, controlling the migration and flowback of unconsolidated particles by gravel packing. Another method uses single layer or multiple layers of screens that filters out the particles before they are produced with the oil and gas. Another method is to treat the unconsolidated material with a consolidating agent that stabilizes the particles within the reservoir.

U.S. Pat. No. 9,494,026 discloses a method of treating a subterranean formation comprising a solvent-based treatment fluid with the reaction product of a multifunctional electrophilic compound containing at least two electrophilic reactive groups and at least one nucleophilic compound. U.S. Pat. No. 9,494,026 discloses gravel packing and also points out that the gravel pack may migrate along with producing fluids, thus contributing to the problem.

U.S. 2003/0230431 discloses the use of a drilling fluid comprised of water, a polymeric cationic catalyst which is adsorbed on weak zones or formations formed by unconsolidated clays, shale, sand stone and the like, a water soluble or dispersible polymer which is cross-linked by a thermoset resin and causes the resin to be hard and tough when cured, a particulate curable solid thermoset resin, a catalyst for curing the solid and water soluble resins. This disclosure employs the use of solid particles in the injection fluid and takes advantage of the effect of heat from the subterranean reservoir to melt the particulate resin and be cured.

U.S. Pat. No. 3,976,140 discloses a method of consolidating incompetent subterranean formation surrounding a well wherein a liquid resin diluted with a two-part diluent is injected into the formation and is followed by an over flush liquid to extract the diluent but leave the resin on the sand grains. The two-part diluent comprises a first component miscible with the resin and a second component immiscible with the resin but miscible with the first component and the over flush liquid.

U.S. Pat. No. 9,567,511 discloses a method of introducing a treatment fluid comprising a solvent-based fluid and a consolidation composition into a wellbore in a subterranean formation, the consolidation comprising, a crosslinking diverting agent, a hardening agent, and a multifunctional epoxy resin, the multifunctional epoxy resin comprising at least three epoxy groups; coating a face of the subterranean formation with the consolidation composition; and at least partially curing the consolidation composition in the wellbore, to reduce production of unconsolidated particulates from the subterranean formation into the wellbore.

U.S. Pat. No. 7,975.764 discloses a sand consolidation system and a method for use of the system. The consolidation system includes an emulsion having an oil phase and an aqueous phase, wherein the emulsion contains a source of insoluble silica particles and a source of calcium hydroxide, wherein the calcium hydroxide particles are present in the oil phase, and the insoluble silica particles are contained in the aqueous phase. Both types of particles must have average particle sizes which will fit into the pores of the formations.

U.S. Pat. No. 6,311,773 discloses improved hardenable resin compositions, and methods of consolidating particulate solids in subterranean zones penetrated by well bores. The resin compositions of this invention are basically comprised of a hardenable organic resin, an aminosilane resin-to-particulate solid coupling agent, a viscous carrier fluid breaker for breaking separating films of viscous carrier fluid between resin coated particulate solids and a surface active agent for causing the resin composition to flow to the contact points between the resin coated particulate solids.

U.S. Pat. No. 5,522,460 discloses a method for water compatible chemical in situ consolidation with oil soluble furan resin. The placement of the fluid is by phase separation rather than by conventional fluid displacement. The method uses the injection of resin/water miscible organic solvent solution followed by a spacer volume of water and acid catalyst injection.

U.S. Pat. No. 4,000,781 discloses using resin coated particles in a remote location, such as a subterranean reservoir or a sand or gravel pack, by contacting them with a cationic aqueous emulsion which contains a resin-forming mixture of poly epoxide and a relatively water-soluble tertiary-amine that is capable of both catalyzing the polymerization of the poly epoxide and oil-wetting of solid surfaces.

U.S. Pat. No. 10,604,694 discloses a method of consolidating particles such as sand and proppant using a composition containing a curing agent, a resin, an emulsifier, and an aqueous solvent. The emulsifier is chosen so as to have a cloud point below the temperature of application in the reservoir. The present invention provides an alternate process where lower concentrations of surfactant and curing agents are required by changing the order of addition prescribed in U.S. Pat. No. 10,604,694.

SUMMARY OF THE INVENTION

The present invention is designed to alleviate the problems encountered with previous art described in the literature and employed in the field. It can prevent proppant, gravel, and sand from migrating out of the reservoir and from screens and gravel packs. It also eliminates the use of volatile solvents or environmentally hazardous solvents. Furthermore, unlike most prior art related to the subject, the present invention does not require a post flush to dilute or remove residual resin and curing agent from the treated reservoir.

The present invention involves a water external emulsion with resin and curing agent as the internal phase. The water based external phase including a surfactant(s) that has a cloud point at or lower than the reservoir temperature to form the emulsion at the surface and to delay the reaction of the resin and curing agent until the emulsion is delivered to the treatment area and heated to the cloud point of the surfactant. When the surfactant reaches or exceeds its cloud point it loses its emulsifying property and releases the resin and curing agent to consolidate the sand, proppants or any other material need to be consolidated. The water acts as a spacer to maintain the permeability required for oil/gas production. Unlike most prior art related to the subject, post flush is not needed in the present invention to remove the extra resin/curing agent in order to maintain the permeability of the treated area. This provides tremendous advantages for treating the formation by saving time, cost, avoiding contamination to the adjacent area and providing better control of the regained permeability.

The present invention has the following advantages:

High flash point, solvent free. Environmentally friendly and safe for operations.

Economical. Use only~10-30% active resin/curing agent in a water external emulsion system. The water external emulsion phase functions as a carrier to carry the resin/curing agent to the reservoir, it also act as a built-in spacer to maintain the permeability of the reservoir and minimize damage due to the resin/curing agent treatment, so post flush to remove the extra resin/curing agent is not required.

Low injection viscosity and low injection pressure.

Versatile with adjustable pumping time and set up time.

Various curing agents can be used for different reservoir temperatures

High compressive strength

Post flush is only required to flush the material out of the tubing and the injection coil tubing. It is not required to post flush the treated formation.

Differing from other aqueous based sand consolidation systems, the present invention is an aqueous emulsion particle consolidation system that involves a unique surfactant or mixture of surfactants chosen to have a cloud point below the temperature of the reservoir being treated. The cloud point is defined as the temperature at which the water soluble surfactant becomes insoluble and may result in phase separation and instability and loss of its surfactant performance. Generally, nonionic surfactants show optimal effectiveness when used near or below their cloud point. Anionic surfactants are more water soluble than nonionic surfactants and will typically have much higher cloud points. In addition, it has been found the order of addition and the method f emulsifying the polyfunctional resin is important to the stability of the entire aqueous emulsion particle consolidation system, allowing it to remain for without separation for extended periods at ambient temperature.

The present invention of an aqueous emulsion particle consolidation system is placed into the reservoir, where it is heated to the reservoir temperature and the surfactant reaches its cloud point, loses its emulsifying characteristics, and releases the resin and curing agents for binding the sand grains. The aqueous phase further serves as a spacer to maintain the permeability needed for the oil and gas production and no post flush is needed to flush away the excess resin and curing agent.

DETAILED DESCRIPTION

The present invention of an aqueous emulsion particle consolidation system involves a surfactant(s) that has a cloud point at or lower than the reservoir temperature in a water-based fluid as external phase, polyfunctional resin and curing agent as the internal phase, together to form an aqueous emulsion particle consolidation system. The reaction time of the resin and curing agent is delayed until the emulsion is delivered to the treatment area and heated to the cloud point of the surfactant. When the surfactant reaches its cloud point it loses its emulsifying characteristic and releases the resin and curing agent to consolidate the sand, proppants or any other material need to be consolidated. The water serves as a spacer to maintain the permeability required for oil and gas production after treatment. Unlike most prior art related to the subject, post flush is not required for the present invention to remove the excess resin/curing agent in order to maintain the permeability of the treatment area.

The composition of the present invention includes:

a) One or more surfactants, present from about 0.05 to 10.0 weight percent of the total composition, preferably 0.02 to 2.0 weight percent and most preferably 0.01 to 1.0 weight percent, including but not limited to anionic surfactant, cationic surfactant, nonionic amphoteric surfactant, and the combinations of two or more surfactants that have cloud points below the down hole application temperature.

b) One or more polyfunctional resins, present from about 10 to 30 weight percent of the total composition, including but not limited to, bis-phenol A diglycidyl ether, bis-phenol F diglycidyl ether, cyclol aliphatic epoxides, furfuryl based epoxies, glycidyl ethers, poly glycidyl ethers, resins derived from cashew nut oil, novalac resins, polyurethane resins, acrylic resin, phenol-formaldehyde resin, and other polyfunctional resins, and combinations thereof c) One or more curing agents, present from about 0.5 to about 10 weight percent of the entire composition, preferably 0.5 to 5.0 weight percent, most preferably 0.4 to 2.0 weight percent, depending on the molecular weight and type of the curing agent, including but not limited to, Lewis acids, tertiary amines, mono ethanol amine, benzyl dimethylamine, 1,4-diaza-bicylo[2,2,2]octane, 1,8-diazabicylo[5,4,0]undec-7ene, cycloaliphatic amines, amidoamines, aliphatic amines, aromatic amines, isophorone, Isophorone diamine, piperidines, polyamides, boron tri-fluoride derivatives, functional resins, imidazoles, imidazolines, morpholines, mercaptans, sulfide, hydrazides, amides and their derivatives, and combinations thereof.

d) Aqueous solvent, from about 60 to about 90 weight percent of the entire composition, including but not limited to fresh water, brine, synthetic brine, sea water, produced brine.

e) Optionally other additives, including but are not limited to, diluents, crosslinking agents, pH control agents, viscosity control agents, defoaming agents, fluid loss additives, corrosion inhibitors, biocides, that are generally used for purposes known to the art may be added.

The amount of surfactant is determined by the concentration necessary to emulsify the resin and curing agent. The amount of curing agent is determined by the amount of resin used so that the resin is cured in the desired amount of time at the desired temperature.

The process of the present invention includes preparing an aqueous emulsion particle consolidation composition containing:
- a. One or more surfactants having a cloud point at or below the reservoir temperature,
- b. One or more polyfunctional resins,
- c. One or more curing agents,
- d. An aqueous solvent.

Mixing the surfactant(s) and curing agents(s) with the polyfunctional resin, slowly adding the aqueous solvent into the polyfunctional resin containing dissolved surfactant and curing agent to form a uniform water external emulsion, introducing the composition into a subterranean reservoir and, allowing sufficient time for the composition to cure. Alternatively the surfactant can be added to the polyfunctional resin and mixed well. The aqueous solvent is slowly added to forma water external emulsion. Then the curing agent is added and mixed well. The composition is then pumped into a subterranean reservoir and sufficient time is allowed for the composition to cure.

Non-inclusive applications for the process include adding the composition to a fracturing process with proppant during or at the end of the fracturing treatment to prevent proppant flowback after the fracture treatment.

Another non-inclusive application for the process involves adding the aqueous emulsion particle consolidation system to gravel packs near the wellbore to prevent undesired sand production.

EXAMPLE

The example below is illustrative only. The present invention may be modified and practiced in different or equivalent ways apparent to those skilled in the art having the benefit of the teachings herein.

Example 1

0.1 gram of a nonionic surfactant having a cloud point of 58° C. and 1.0 gram of a curing agent are mixed with 10.0 grams Bisphenol A diglycidyl ether resin using a magnetic stirrer. After mixing for 2 minutes, 50 grams of Houston tap water are added slowly while stirring to form an homogeneous emulsion.

One pore volume of the emulsion made above is injected to a 10-cc disposable syringe containing 7 grams of 20/40 sand. The tip of the syringe is then capped and it is set in a 90C oven for 24 hours.

The syringe is removed from the oven and the resulting consolidated sand block is tested for regained permeability and unconfined crush strength (UCS) using the methods known to those familiar with the art. The sand block was found have a regained permeability of 93% and a UCS of 1275 lb/in$^2$.

Alternately it has been found that equivalent results are obtained if the curing agent(s) are added after forming the emulsion of the polyfunctional resin in the aqueous solvent containing surfactant.

The present invention may be modified and practiced in different or equivalent ways apparent to those skilled in the art having the benefit of the teachings herein.

What is claimed is:

1. A process for the consolidation of particles that includes preparing an aqueous emulsion particle consolidation composition containing:
   - a. one or more surfactants having a cloud point at or below the reservoir temperature,
   - b. one or more resins,
   - c. one or more curing agents,
   - e. an aqueous solvent,
   - dissolving the one or more surfactants in the one or more resins adding the aqueous solvent to form a water external emulsion, adding one or more curing agents, introducing the composition into a subterranean reservoir;

and;

allowing sufficient time for the composition to cure.

2. The process described in claim 1 where the one or more surfactants having a cloud point at or below the reservoir temperature is selected from the group nonionic surfactants.

3. The process described in claim 1 where the one or more resins is selected from the group bis-phenol A diglycidyl ether, bis-phenol F diglycidyl ether, cycloaliphatic epoxides, furfuryl based epoxies, glycidyl ethers, poly glycidyl ethers, novalac resins, polyurethane resins, acrylic resin, phenol-formaldehyde resin, and combinations thereof.

4. The process described in claim 1 where the one or more curing agents is selected from the group Lewis acids, tertiary amines, mono ethanol amine, benzyl dimethylamine, 1,4-diaza-bicylo[2,2,2] octane, 1,8-diazabicyclo[5,4,0] undec-7ene, cycloaliphatic amines, amidoamines, aliphatic amines, aromatic amines, isophorone, Isophorone diamine, polyamides, boron tri-fluoride derivatives, imidazoles, imidazolines, morpholines, mercaptans, piperidines, sulfide, hydrazides, amides, and combinations thereof.

5. The process described in claim 1 where the particles are sand.

6. The process described in claim 1 where the resin is bisphenol A diglycidyl ether.

* * * * *